United States Patent
Hernandez Covarrubias et al.

(10) Patent No.: US 11,624,222 B2
(45) Date of Patent: Apr. 11, 2023

(54) VEHICLE INCLUDING A VEHICLE CARGO AREA WITH A VEHICLE CARGO COVER HAVING A CLIP

(71) Applicant: GM GLOBAL TECHNOLOGY OPERATIONS LLC, Detroit, MI (US)

(72) Inventors: Alejandro Hernandez Covarrubias, Toluca (MX); Juan Manuel Alvarado, Toluca (MX); Frank W. Schipperijn, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 365 days.

(21) Appl. No.: 16/922,230

(22) Filed: Jul. 7, 2020

(65) Prior Publication Data
US 2022/0010605 A1     Jan. 13, 2022

(51) Int. Cl.
*E05D 5/02*    (2006.01)
*E05D 7/10*    (2006.01)
*B60R 7/02*    (2006.01)

(52) U.S. Cl.
CPC .............. *E05D 5/0207* (2013.01); *B60R 7/02* (2013.01); *E05D 7/10* (2013.01)

(58) Field of Classification Search
CPC . B60R 5/044; B60R 5/04; B60R 5/045; B60J 7/10; B60J 7/1621
USPC ................. 296/37.16, 24.43, 24.44, 100.06
See application file for complete search history.

(56) References Cited

U.S. PATENT DOCUMENTS

| | | | |
|---|---|---|---|
| 6,176,535 B1 | 1/2001 | Chaloult | |
| 6,702,355 B1 | 3/2004 | Price | |
| 9,387,807 B2 | 7/2016 | Horst | |
| 10,065,564 B2 | 9/2018 | Romero | |
| 10,112,543 B1 | 10/2018 | Mejia Perez et al. | |
| 10,280,664 B1 | 5/2019 | Cruz Lopez et al. | |
| 10,286,848 B2 | 5/2019 | Herman | |
| 10,328,861 B2 | 6/2019 | Gasca Fuentes | |
| 10,494,843 B2 | 12/2019 | Celis Torres | |
| 2012/0133171 A1* | 5/2012 | Honda | B60R 5/044 296/37.16 |

FOREIGN PATENT DOCUMENTS

| | | | |
|---|---|---|---|
| EP | 0662426 A1 * | 7/1995 | |
| FR | 2968615 A1 * | 6/2012 | ............. B60R 5/044 |
| KR | 100821143 B1 * | 4/2008 | |
| KR | 100929919 B1 * | 12/2009 | |
| KR | 100937244 B1 * | 1/2010 | |
| KR | 101459492 B1 * | 11/2014 | |

OTHER PUBLICATIONS

Machine translation of KR-100821143-B1.*
Machine translation FR-2968615-A1.*

* cited by examiner

*Primary Examiner* — Dennis H Pedder
*Assistant Examiner* — Kevin P Weldon
(74) *Attorney, Agent, or Firm* — Vivacqua Crane PLLC

(57) ABSTRACT

A vehicle including a vehicle cargo area includes a hinge pin in a wall of the vehicle cargo area, a cargo cover defining first and second slots, a single-piece clip which includes a first fixing feature positioned in the first slot, and a second fixing feature positioned in the second slot. The clip defines a channel receiving the hinge pin.

19 Claims, 5 Drawing Sheets

VEHICLE INCLUDING A VEHICLE CARGO AREA WITH A VEHICLE CARGO COVER HAVING A CLIP

FIELD

The present disclosure relates to a vehicle including a vehicle cargo area with a vehicle cargo cover having a clip.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Conventional vehicles may include a cargo cover that is removably hinged within a cargo area of the vehicle using an omega clip assembly. FIG. 1 illustrates a conventional cargo cover 100 which includes an omega clip assembly 102 being installed into a cargo area of a vehicle (not shown) by an installer 104. The clip assembly 102 works together with a hinge pin 106 in the vehicle cargo area to enable the cargo cover 100 to pivot while also securing the cargo cover 100 within the vehicle. These hinge designs suffer from a high effort being required engaging the omega clip assembly 102 with the hinge pin 106 during installation of the cargo cover 100 into the vehicle. These hinge designs also lack feedback to the installer 104 when the cargo cover 100 is being installed or removed. Further, these omega clip assemblies 102 may generate undesirable noise during the normal levels of vibration experienced in a cargo area of a vehicle during operation.

SUMMARY

In an exemplary aspect, a vehicle including a vehicle cargo area includes a hinge pin in a wall of the vehicle cargo area, a cargo cover defining first and second slots, a single-piece clip which includes a first fixing feature positioned in the first slot, and a second fixing feature positioned in the second slot and the clip defines a channel receiving the hinge pin.

In another exemplary aspect, each of the first fixing feature and the second fixing feature includes a first cylindrical portion extending from a side wall of the clip.

In another exemplary aspect, each of the first fixing feature and the second fixing feature further includes a second cylindrical portion spaced from the side wall.

In another exemplary aspect, a diameter of the second cylindrical portion is larger than a diameter of the first cylindrical portion.

In another exemplary aspect, the cargo cover is positioned between the second cylindrical portions and the side wall of the clip.

In another exemplary aspect, each of the first fixing feature and the second fixing feature includes a cylindrical protrusion extending from a side wall of the clip.

In another exemplary aspect, each of the first fixing feature and the second fixing feature further includes a planar tab extending from the cylindrical protrusion.

In another exemplary aspect, the cargo cover is positioned between the planar tabs and the side wall of the clip.

In another exemplary aspect, the clip is formed from EPDM rubber.

In another exemplary aspect, the channel forms an opening in a lower face of the clip.

In another exemplary aspect, the opening is positioned closer to one of the first fixing feature and the second fixing feature than the other one of the first fixing feature and the second fixing feature.

In another exemplary aspect, the channel extends upwardly from the opening and turns toward the other one of the first fixing feature and the second fixing feature.

In another exemplary aspect, a width of the opening is larger than a diameter of the hinge pin.

In another exemplary aspect, the channel defines a pinch point having a narrower width than the remainder of the channel.

In another exemplary aspect, the pinch point is defined between an upwardly extending wall portion in a lower section of the channel and a downwardly extending wall portion in an upper section of the channel.

In another exemplary aspect, the width of the pinch point is less than a diameter of the hinge pin.

In another exemplary aspect, a cross-section of the hinge pin forms an elliptical shape.

In another exemplary aspect, a wall of the cargo cover and a sidewall of the clip are non-orthogonal with respect to a surface of a wall of the vehicle cargo area and a longitudinal axis of the hinge pin.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
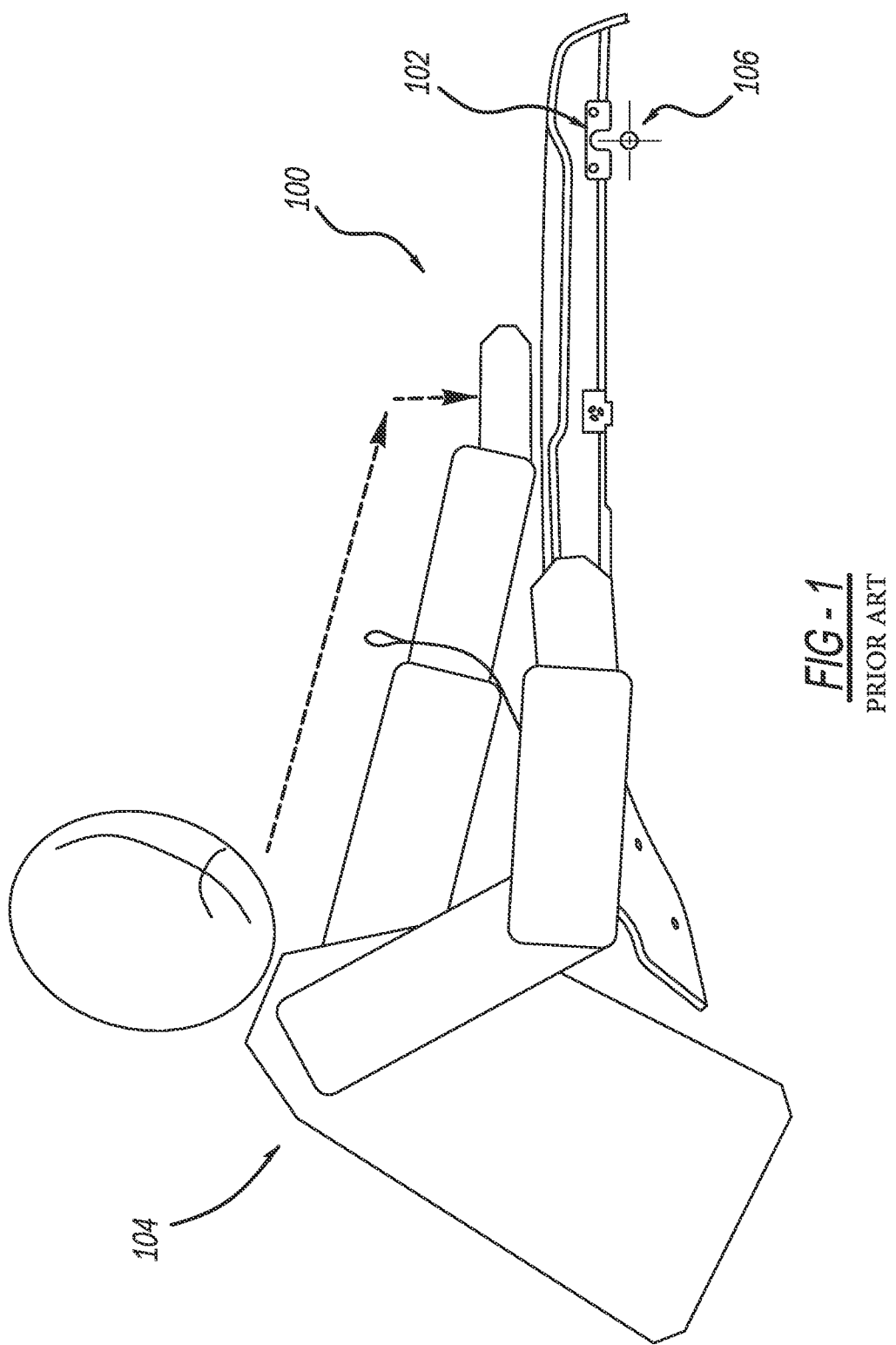
FIG. 1 is a schematic view of a cargo cover which includes an omega clip assembly being installed into a cargo area of a vehicle by an installer.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 2:
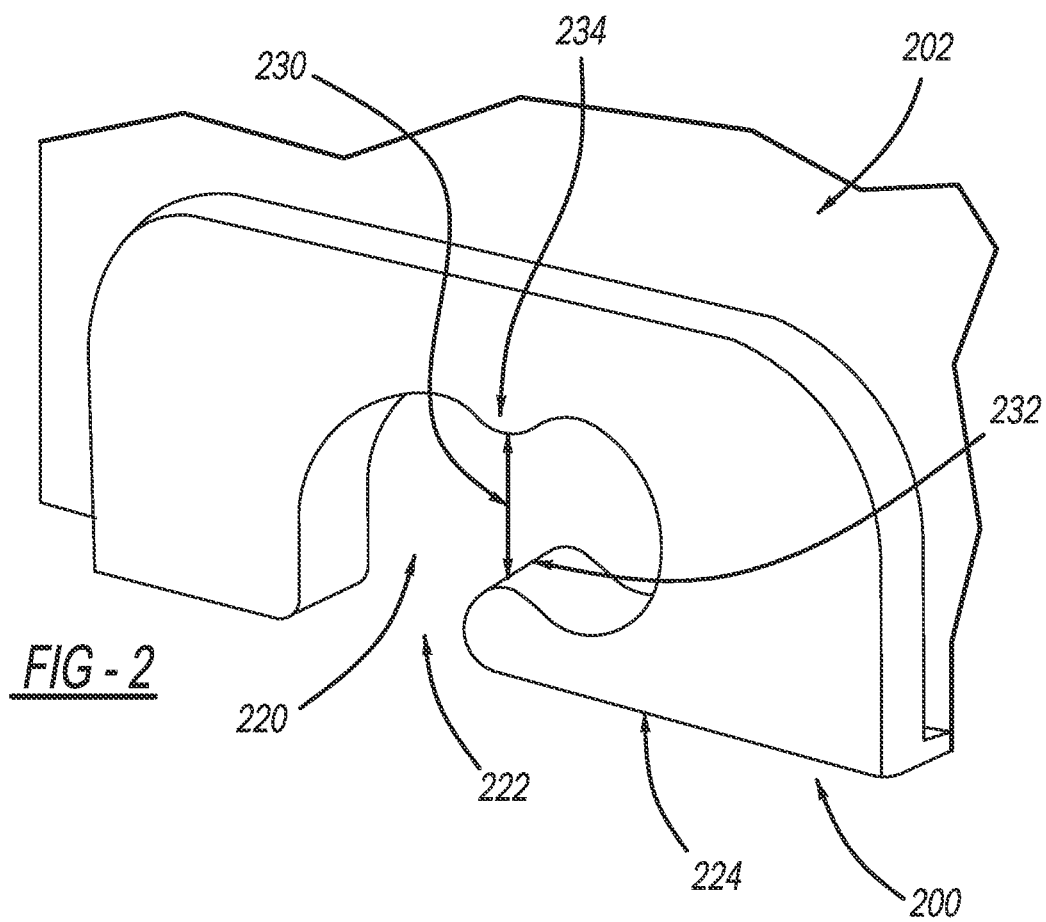
FIG. 2 is a perspective view of an exemplary clip installed in a cargo cover in accordance with the present disclosure.
Figure 3:
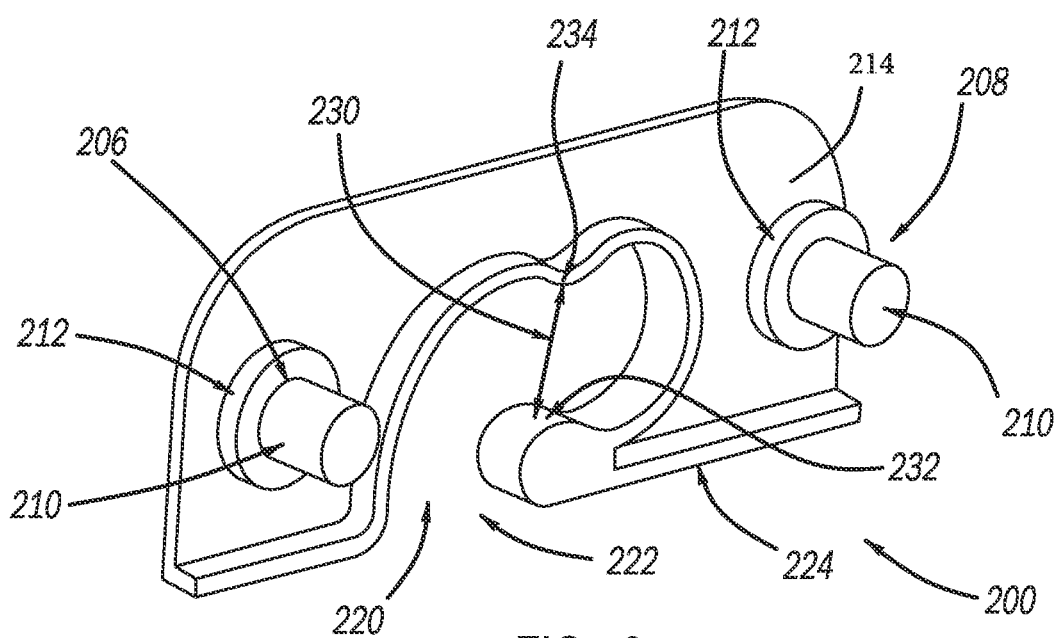
FIG. 3 illustrates another perspective view of the clip of FIG. 2.
Figure 4:
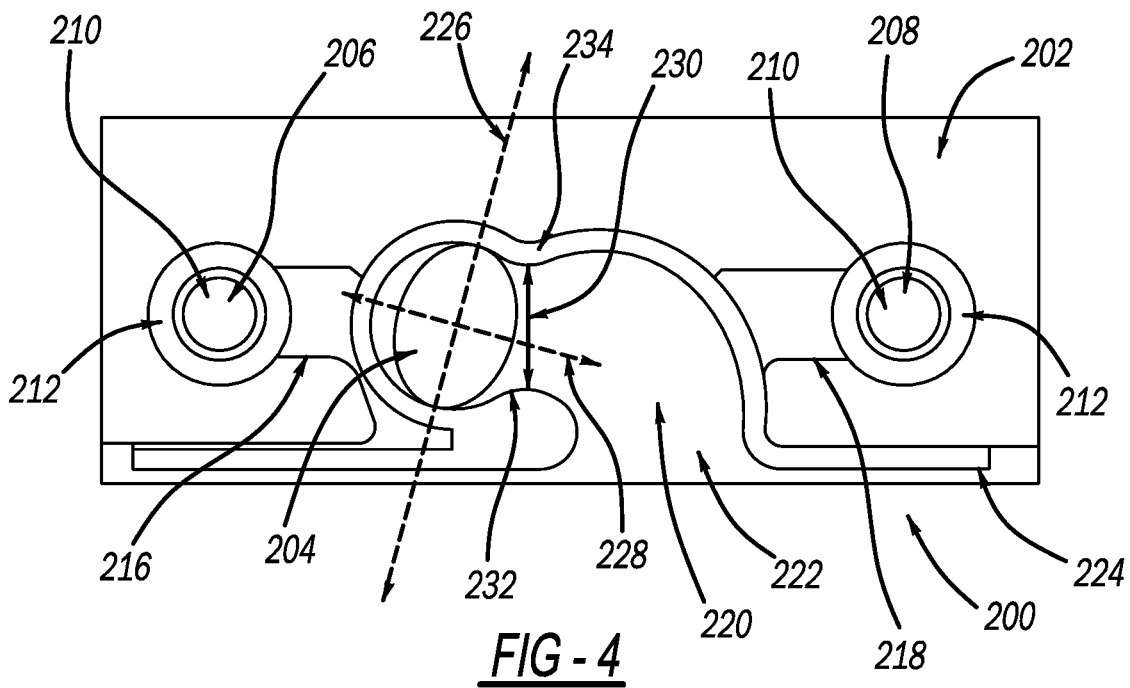
FIG. 4 illustrates a side view of the clip of FIG. 2 installed in the cargo cover and the clip engaging a hinge pin of a vehicle cargo area.
Figure 5:
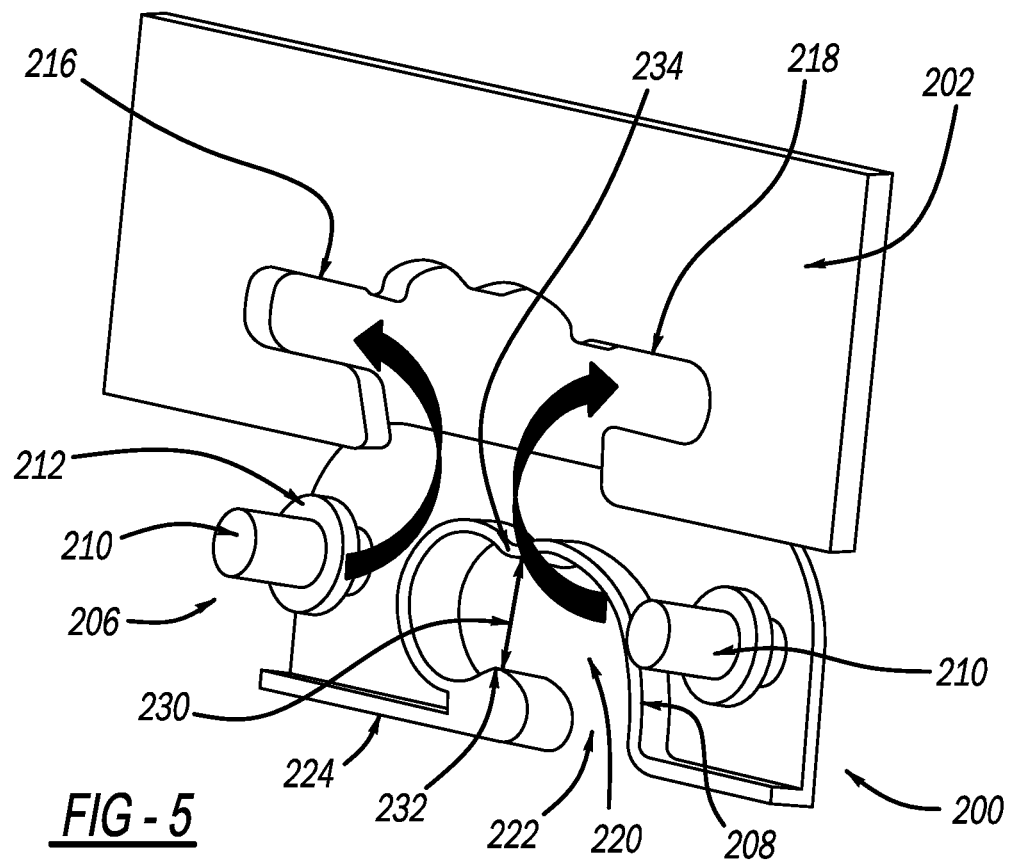
FIG. 5 is a perspective view of the clip prior to incorporation into the cargo cover.

Referring now to the drawings, wherein like reference numbers correspond to like or similar components throughout the several figures, FIG. 2 is a perspective view of an exemplary clip 200 installed in a cargo cover 202 in accordance with the present disclosure and FIG. 3 illustrates another perspective view of the clip 200. FIG. 4 illustrates a side view of the clip 200 installed in the cargo cover 200 and the clip 200 engaging a hinge pin 204 of a vehicle cargo area and FIG. 5 is an exploded perspective view of the clip 200 and the cargo cover 202. FIG. 4 further illustrates the clip 200 engaging a corresponding hinge pin 204 in a vehicle cargo area and FIG. 5 is a perspective view of the clip 200 prior to incorporation into the cargo cover 202. The clip 200 includes a first fixing feature 206 and a second fixing feature 208. The first and second fixing features 206 and 208 each form a first cylindrical portion 210 extending from a side wall 214 of the clip 200 and a second cylindrical portion 212 radially extending from the first cylindrical portion 210 and offset (or spaced from) from the side wall 214. Thus, the second cylindrical portion 212 has a larger diameter than the first cylindrical portion 210. The cargo cover 202 defines corresponding first and second slots, 216 and 218, for receiving each of the first cylindrical portions 210 of the corresponding first and second fixing features 206 and 208. Each of the second cylindrical portions 212 have a diameter which is larger than the first and second slots 216 and 218. In this manner, the cargo cover 202 is captured between the side wall 214 and the second cylindrical portions 212. The clip 200 is formed of a single-piece and is preferably made of an elastic material such as, for example, a synthetic EPDM rubber or the like. Forming the clip 200 from an elastic material such as, for example, EPDM rubber, enables the clip 200 to be formed into a single piece and provides the ability for the clip 200 to dampen vibrations, thereby reducing and/or eliminating noise.

The clip 200 also includes a channel 220. The channel 220 includes an opening 222 in a lower face 224 of the clip 200. The opening 222 is positioned closer to one of the first fixing feature 206 and the second fixing feature 208 than the other one of the first fixing feature 206 and the second fixing feature 208. The channel 220 extends upwardly from the opening 222 and turns toward the other one of the first fixing feature 206 and the second fixing feature 208. The channel 220 is configured to receive the hinge pin 204 in the vehicle cargo area during installation and operation of the cargo cover 202. The width of the channel 220 is larger than the diameter of the hinge pin 204 at the opening to permit the hinge pin 204 to pass into the channel 220 during installation. As installation continues, the cargo cover 202 which includes the clip 200 is moved in a manner which causes the hinge pin 204 to move further into the channel 220. The channel 220 further defines a pinch point 230 having a narrower width than the remainder of the channel 220. The pinch point 230 may be defined between an upwardly extending wall portion 232 in a lower section of the channel 220 closer to the opening 222 and a downwardly extending wall portion 234 in an upper section of the channel 220. The width of the channel 220 across the pinch point 230 is preferably less than an outer diameter of the hinge pin 204.

Optionally, a cross section of the hinge pin 204 may form an oval or elliptical shape. The diameter along the semi-major axis 226 of the elliptical shape of the hinge pin 204 is longer than diameter along the semi-minor axis 228 of the hinge pin 204. The diameter along the semi-major axis 225 of an elliptical hinge pin 204 will also be greater than the width of the channel 220 across the pinch point 230.

Figure 6:
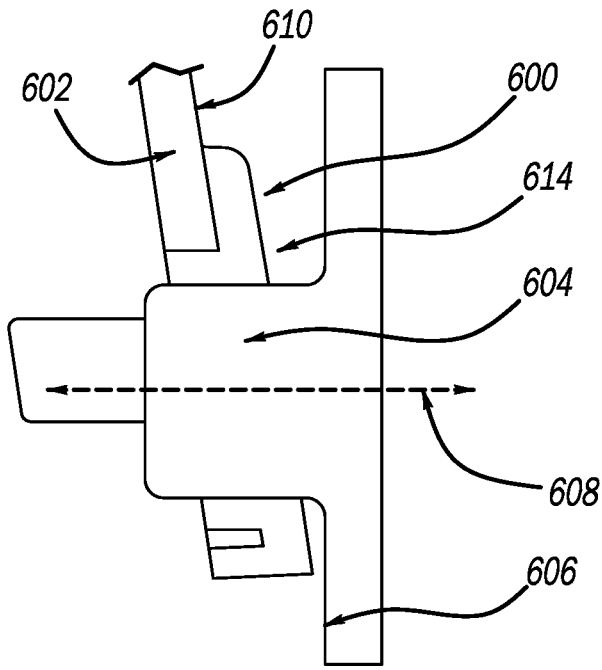
FIG. 6 is a cross-sectional view of another exemplary clip installed into a cargo cover and engaging a hinge pin of a vehicle cargo area.

FIG. 6 is a cross-sectional view of another exemplary clip 600 installed into a cargo cover 602 and engaging a hinge pin 604 of a vehicle cargo area. As is clearly illustrated, a wall 610 of the cargo cover 602 and the sidewall 614 of the clip 600 are non-orthogonal with respect to the surface 606 of a wall 616 of the vehicle cargo area and the longitudinal axis 608 of the hinge pin 604. In this manner, the clip 600 serves as a bumper between the cargo cover 602 and the wall 616 of the vehicle cargo area which, because of its elastic material, reduces and/or eliminates vibrations.

Figure 7:
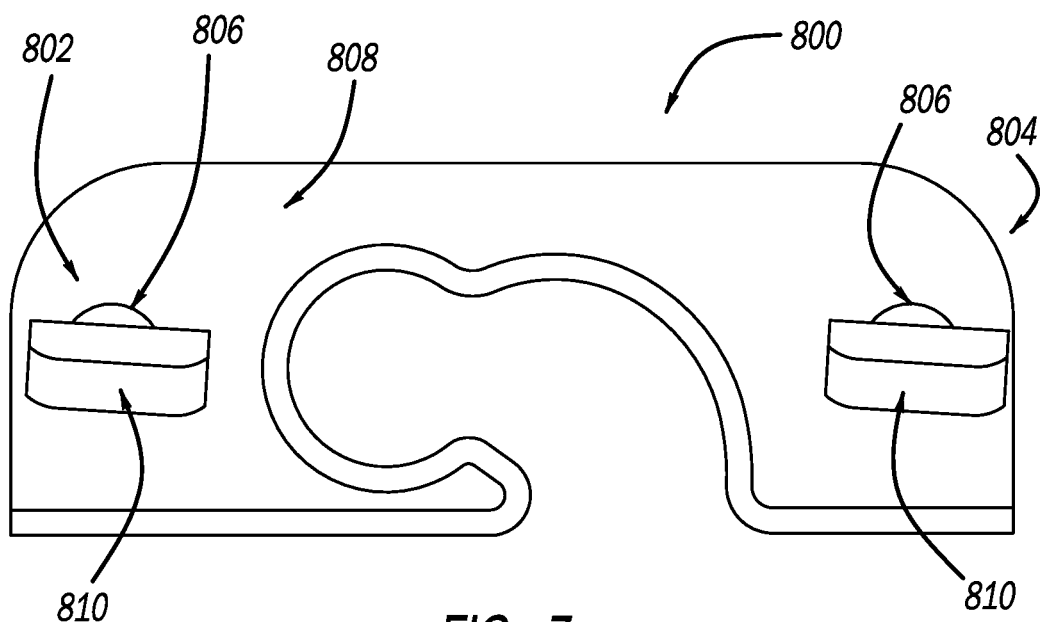
FIG. 7 is an elevation view of another exemplary clip in accordance with the present disclosure.
Figure 8:
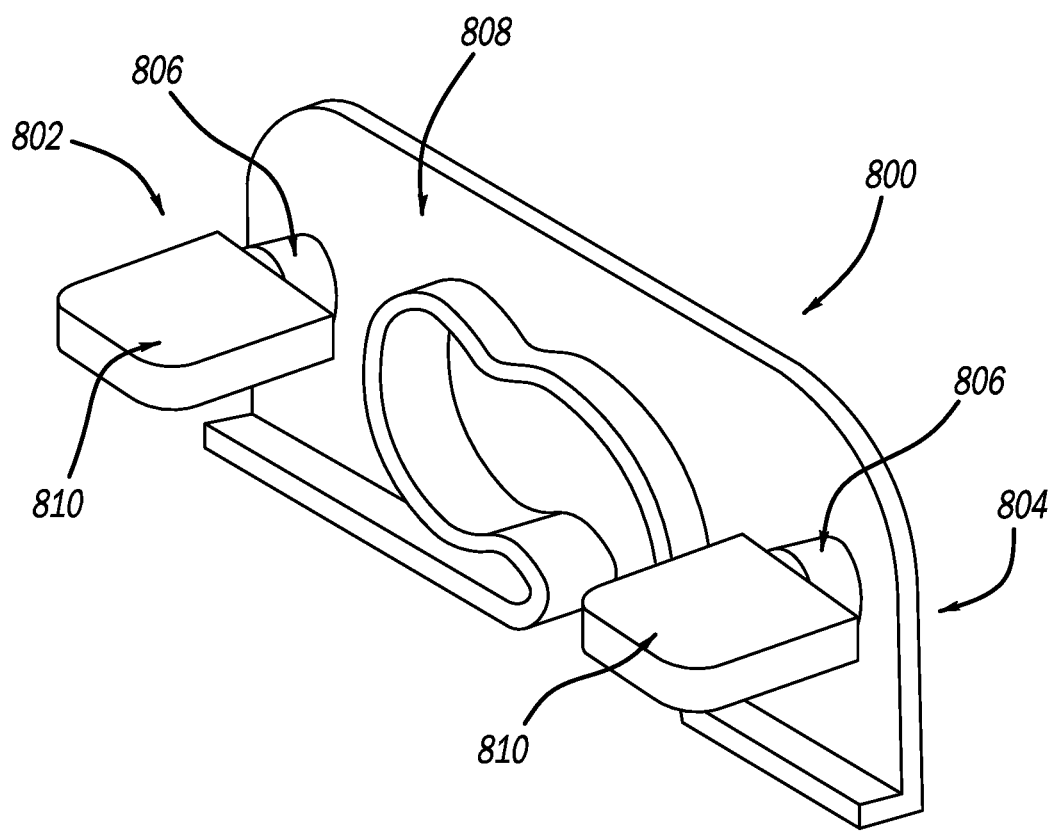
FIG. 8 is a perspective view of the clip of FIG. 7.

FIG. 7 is an elevation view of another exemplary clip 800 in accordance with the present disclosure and FIG. 8 provides a perspective view of the clip 800. The clip 800 includes a first fixing feature 802 and a second fixing feature 804. Each of the first fixing feature 802 and second fixing feature 804 include a cylindrical protrusion 806 extending from a side wall 808 of the clip 800 and a planar tab 810 extending from the cylindrical protrusion 806.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle including a vehicle cargo area comprising:
a hinge pin in a wall of the vehicle cargo area;
a cargo cover defining first and second slots; and
a single-piece clip comprising:
a first fixing feature positioned in the first slot; and
a second fixing feature positioned in the second slot, wherein the clip defines a channel receiving the hinge pin,
wherein a wall of the cargo cover and a side wall of the clip are non-orthogonal with respect to a surface of a wall of the vehicle cargo area and a longitudinal axis of the hinge pin.

2. The vehicle of claim 1, wherein each of the first fixing feature and the second fixing feature comprises a first cylindrical portion extending from the side wall of the clip.

3. The vehicle of claim 2, wherein each of the first fixing feature and the second fixing feature further comprises a second cylindrical portion spaced from the side wall.

4. The vehicle of claim 3, wherein a diameter of the second cylindrical portion is larger than a diameter of the first cylindrical portion.

5. The vehicle of claim 4, wherein the cargo cover is positioned between the second cylindrical portions and the side wall of the clip.

6. The vehicle of claim 1, wherein each of the first fixing feature and the second fixing feature comprises a cylindrical protrusion extending from the side wall of the clip.

7. The vehicle of claim 6, wherein each of the first fixing feature and the second fixing feature further comprises a planar tab extending from the cylindrical protrusion.

8. The vehicle of claim 7, wherein the cargo cover is positioned between the planar tabs and the side wall of the clip.

9. The vehicle of claim 1, wherein the clip comprises EPDM rubber.

10. The vehicle of claim 1, wherein the channel forms an opening in a lower face of the clip.

11. The vehicle of claim 10, wherein the opening is positioned closer to one of the first fixing feature and the second fixing feature than the other one of the first fixing feature and the second fixing feature.

12. The vehicle of claim 11, wherein the channel extends upwardly from the opening and turns toward the other one of the first fixing feature and the second fixing feature.

13. The vehicle of claim 10, wherein a width of the opening is larger than a diameter of the hinge pin.

14. The vehicle of claim 1, wherein the channel defines a pinch point having a narrower width than the remainder of the channel.

15. The vehicle of claim 14, wherein the pinch point is defined between an upwardly extending wall portion in a lower section of the channel and a downwardly extending wall portion in an upper section of the channel.

16. The vehicle of claim 14, wherein the width of the pinch point is less than a diameter of the hinge pin.

17. The vehicle of claim 1, wherein a cross-section of the hinge pin forms an elliptical shape.

18. A vehicle cargo cover in a vehicle, comprising:
a hinge pin in a wall of a vehicle cargo area in the vehicle;
a cargo cover defining first and second slots; and
a single-piece clip comprising:
   a first fixing feature positioned in the first slot; and
   a second fixing feature positioned in the second slot, wherein the clip defines a channel receiving the hinge pin, wherein each of the first fixing feature and the second fixing feature comprises a first cylindrical portion extending from a side wall of the clip, wherein each of the first fixing feature and the second fixing feature further comprises a second cylindrical portion spaced from the side wall, wherein a diameter of the second cylindrical portion is larger than a diameter of the first cylindrical portion, wherein the cargo cover is positioned between the second cylindrical portions and the side wall of the clip, wherein the channel forms an opening in a lower face of the clip, wherein the opening is positioned closer to one of the first fixing feature and the second fixing feature than the other one of the first fixing feature and the second fixing feature, wherein the channel extends upwardly from the opening and turns toward the other one of the first fixing feature and the second fixing feature, wherein a width of the opening is larger than a diameter of the hinge pin, wherein the channel defines a pinch point having a narrower width than the remainder of the channel, wherein the pinch point is defined between an upwardly extending wall portion in a lower section of the channel and a downwardly extending wall portion in an upper section of the channel, wherein the width of the pinch point is less than a diameter of the hinge pin, and wherein a cross-section of the hinge pin forms an elliptical shape.

19. A vehicle cargo cover in a vehicle, comprising:
a hinge pin in a wall of a vehicle cargo area in the vehicle;
a cargo cover defining first and second slots; and
a single-piece clip comprising:
   a first fixing feature positioned in the first slot; and
   a second fixing feature positioned in the second slot, wherein the clip defines a channel receiving the hinge pin, wherein each of the first fixing feature and the second fixing feature comprises a cylindrical protrusion extending from a side wall of the clip, wherein each of the first fixing feature and the second fixing feature further comprises a planar tab extending from the cylindrical protrusion, wherein the cargo cover is positioned between the planar tabs and the side wall of the clip, wherein the channel forms an opening in a lower face of the clip, wherein the opening is positioned closer to one of the first fixing feature and the second fixing feature than the other one of the first fixing feature and the second fixing feature, wherein the channel extends upwardly from the opening and turns toward the other one of the first fixing feature and the second fixing feature, wherein a width of the opening is larger than a diameter of the hinge pin, wherein the channel defines a pinch point having a narrower width than the remainder of the channel, wherein the pinch point is defined between an upwardly extending wall portion in a lower section of the channel and a downwardly extending wall portion in an upper section of the channel, wherein the width of the pinch point is less than a diameter of the hinge pin, and wherein a cross-section of the hinge pin forms an elliptical shape.

* * * * *